Figure 1:
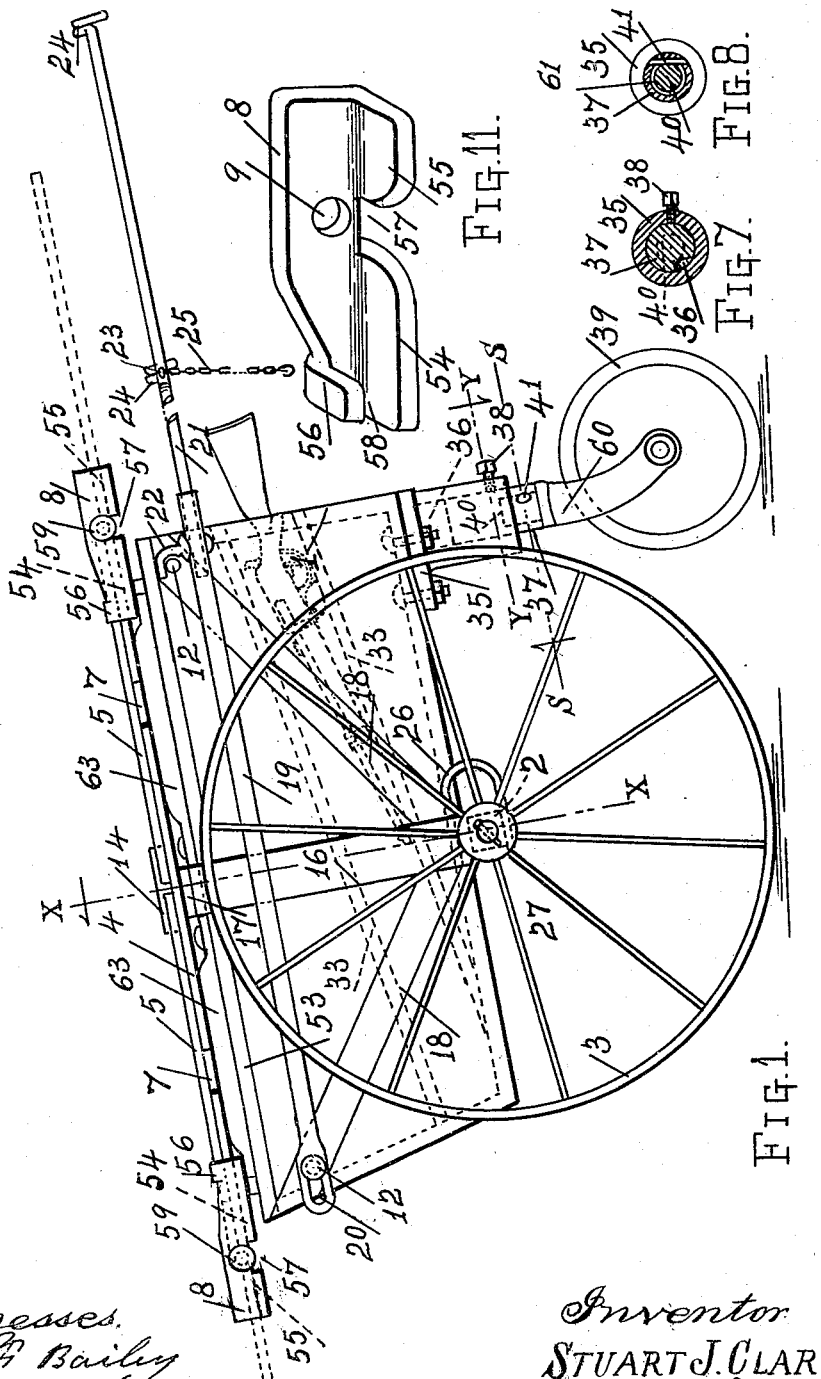

S. J. CLARK.
ARMORED VEHICLE.
APPLICATION FILED JAN. 17, 1916.

1,213,074.

Patented Jan. 16, 1917.
6 SHEETS—SHEET 3.

Witnesses.
W. F. Bailey
G. H. Miller

Inventor
STUART J. CLARK.
by Atty N. DuBois.

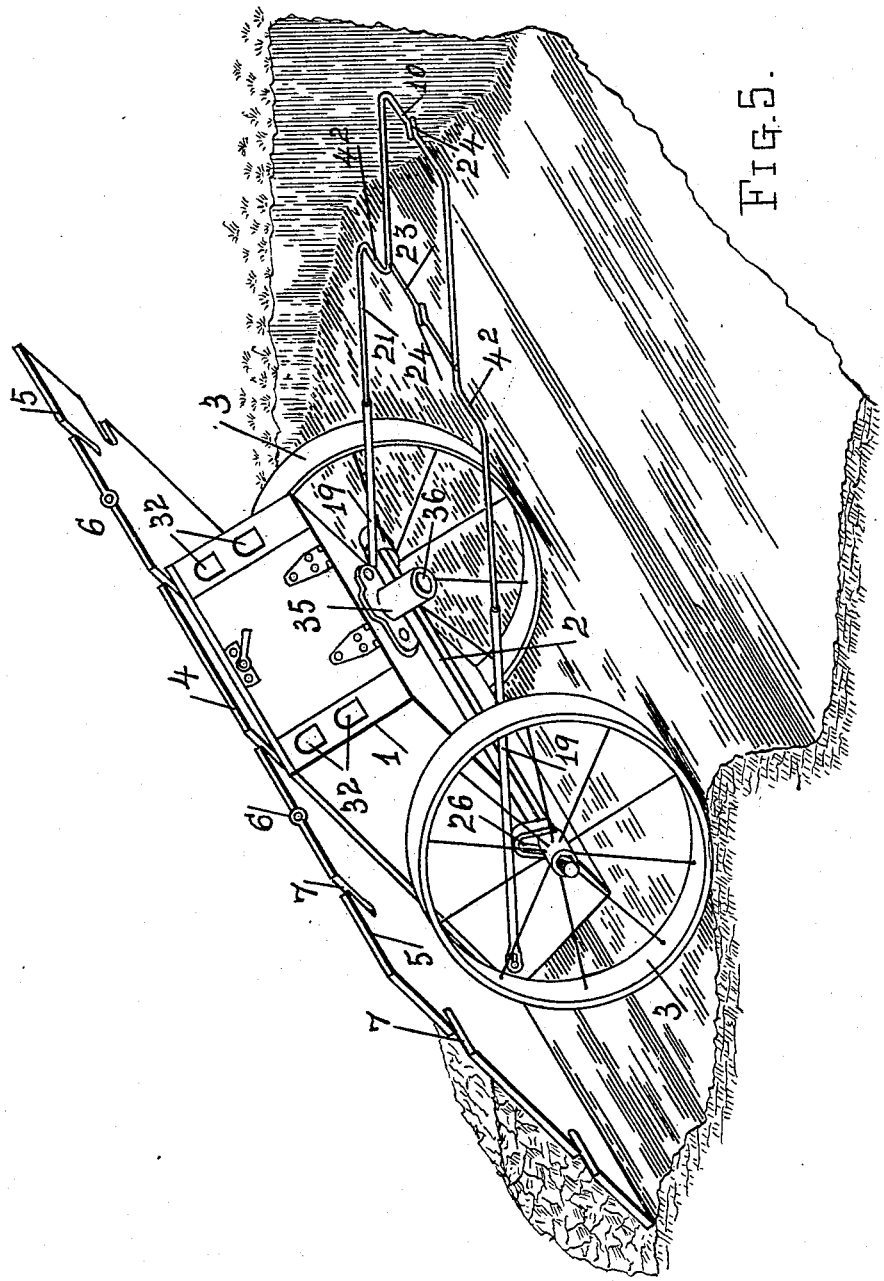

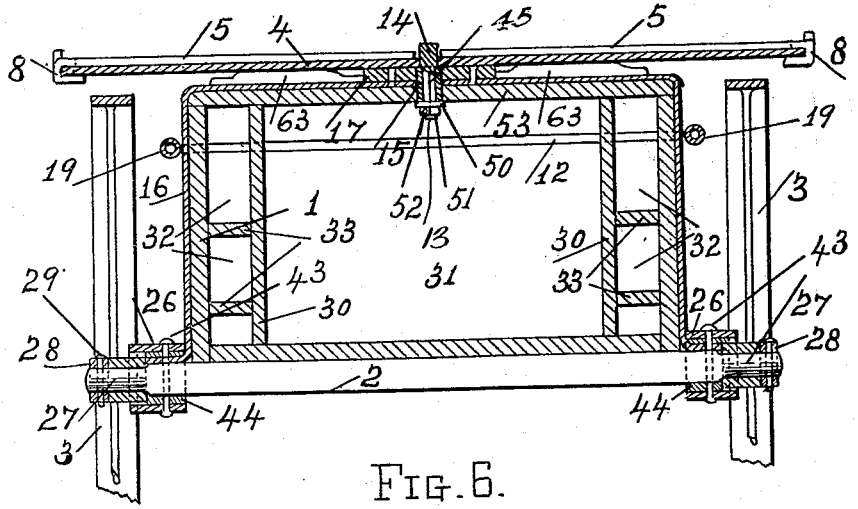
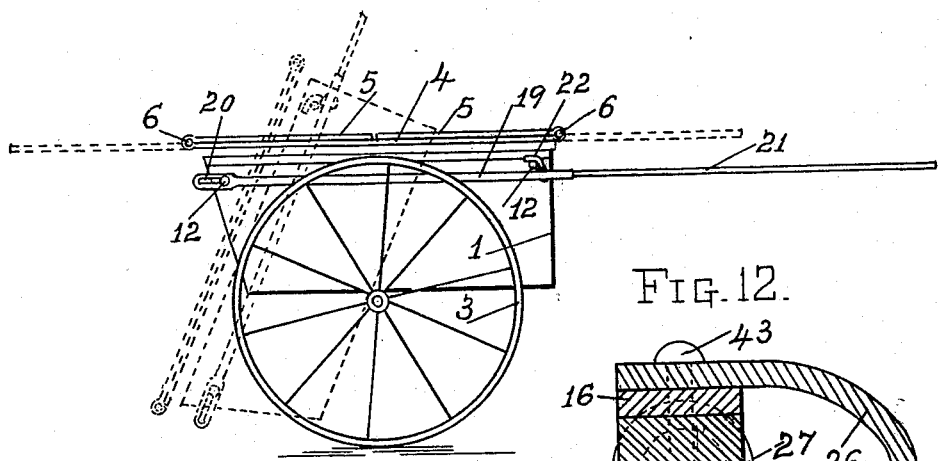
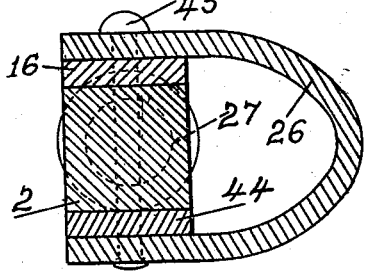

S. J. CLARK.
ARMORED VEHICLE.
APPLICATION FILED JAN. 17, 1916.

1,213,074.

Patented Jan. 16, 1917.
6 SHEETS—SHEET 6.

Witnesses.
W. F. Bailey
G. H. Miller

Inventor.
Stuart J. Clark
by Atty N. DuBois.

UNITED STATES PATENT OFFICE.

STUART J. CLARK, OF AUBURN, ILLINOIS, ASSIGNOR OF ONE-EIGHTH TO O. A. WINEMAN, ONE-EIGHTH TO HENRY HARRIS, ONE-EIGHTH TO CARL BRENNER, ONE-EIGHTH TO C. E. OGG, ONE-EIGHTH TO D. T. QUEEN, AND ONE-EIGHTH TO L. J. FOSTER, ALL OF AUBURN, ILLINOIS.

ARMORED VEHICLE.

1,213,074.      Specification of Letters Patent.      Patented Jan. 16, 1917.

Application filed January 17, 1916. Serial No. 72,501.

*To all whom it may concern:*

Be it known that I, STUART J. CLARK, a citizen of the United States, residing at Auburn, in the county of Sangamon and State of Illinois, have invented a new and useful Armored Vehicle, of which the following is a specification.

This invention relates to military implements designed to protect soldiers advancing or retreating under fire and to protect them while intrenching under fire.

The purposes of the invention are to provide a military implement adapted to be manned by four men, and adapted to protect the four men operating it; to provide in connection with a propellable vehicle a shield adapted to withstand musketry fire, or shrapnel fire and capable of variable inclinations relative to the line of travel of the machine; to provide in connection with a propellable vehicle a rotative shield the length of which is approximately twice its width; to provide improved means for connecting the shield with the vehicle; to provide in connection with a propellable vehicle, a shield comprising a central section rotative on the vehicle and wing-sections hinged on the central section; to provide a bail of such form that the four men manning the implement may all push on the handles at the same time and may all be under cover of the shield; to provide simple and effective means for supporting the bail at convenient height for propelling the machine when the wings are extended and the shield is in its inclined position; to provide in conjunction with a shield comprising a central section and hinged wing-sections, means for supporting the extended wing-sections to prevent sagging of the wing-sections and undue strain on the hinges; to provide means to prevent wabbling of the wing sections when they are folded down on the central section; to provide facilities for housing and carrying the arms, munitions and supplies of the four soldiers manning the machine; to provide means for supporting the rear part of the vehicle body and varying its height relative to the ground on which the vehicle is operating; and to provide other new and useful features of construction.

The invention consists in the new and useful mechanisms shown in the annexed drawings and hereinafter particularly described and finally recited in the claims.

I will illustrate and describe a three-wheel vehicle embodying my invention, but it is to be understood that the vehicle may have a greater or a less number of wheels and the structure of the vehicle box or body may be varied without departure from my invention.

Figure 2:
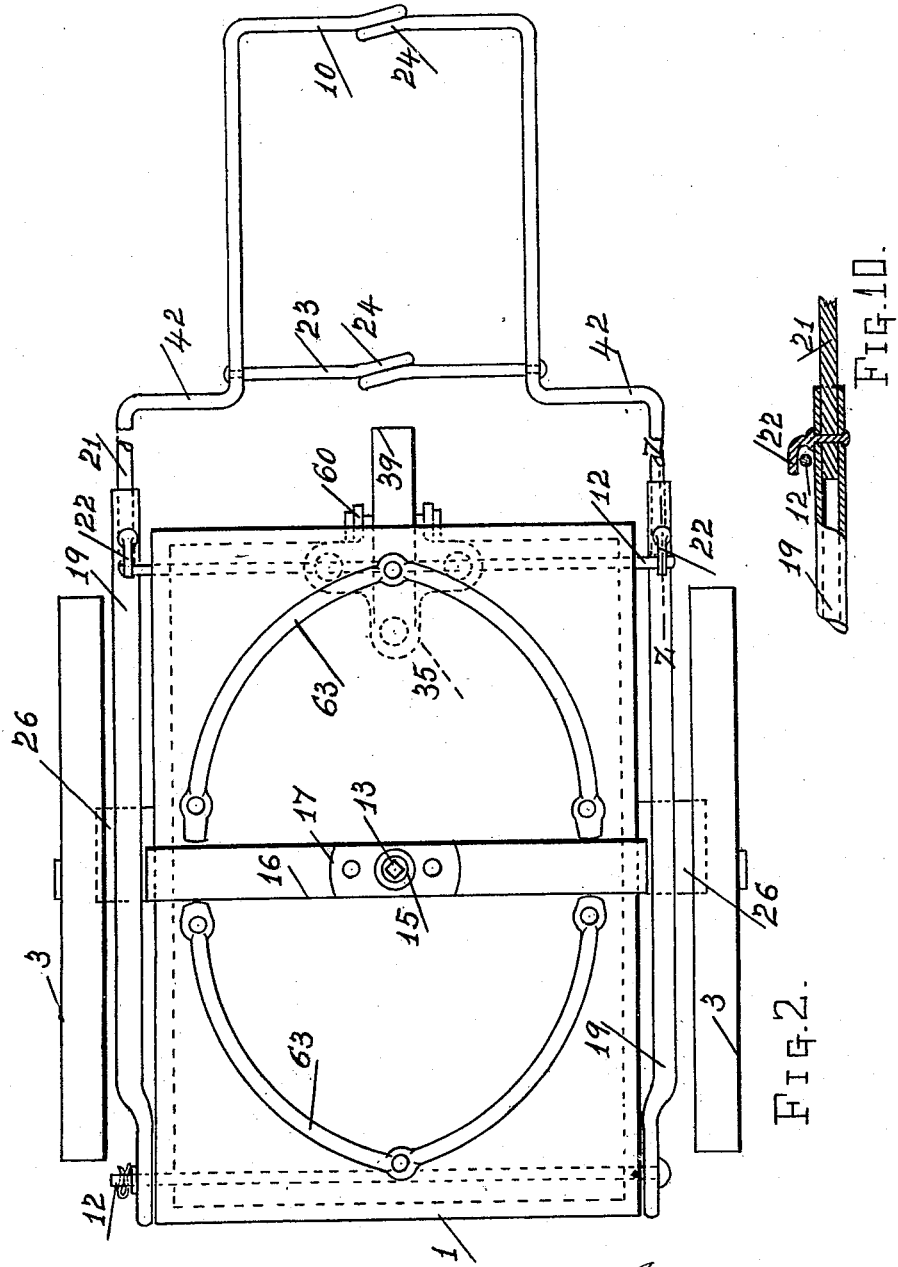
Figure 3:
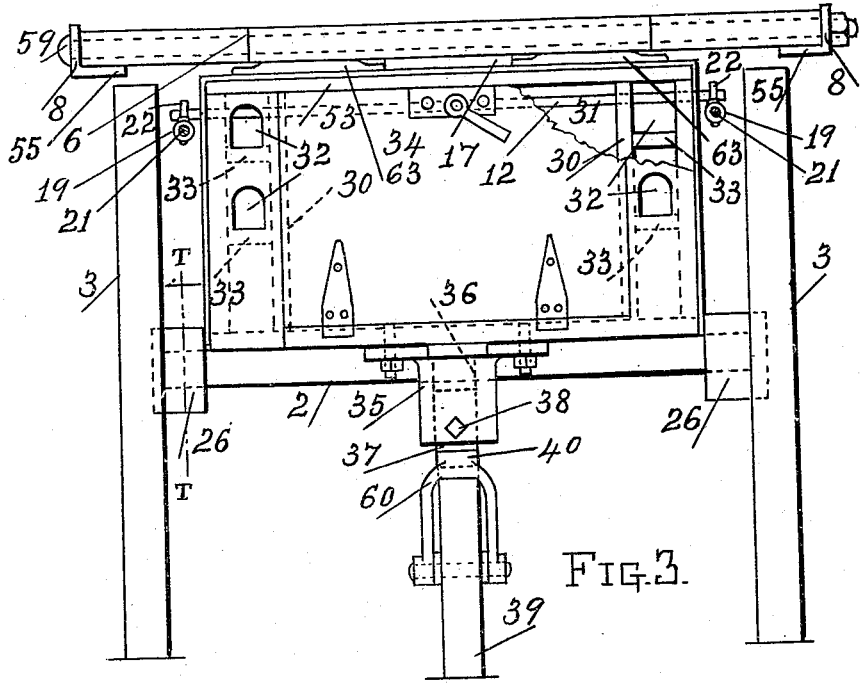
Figure 4:
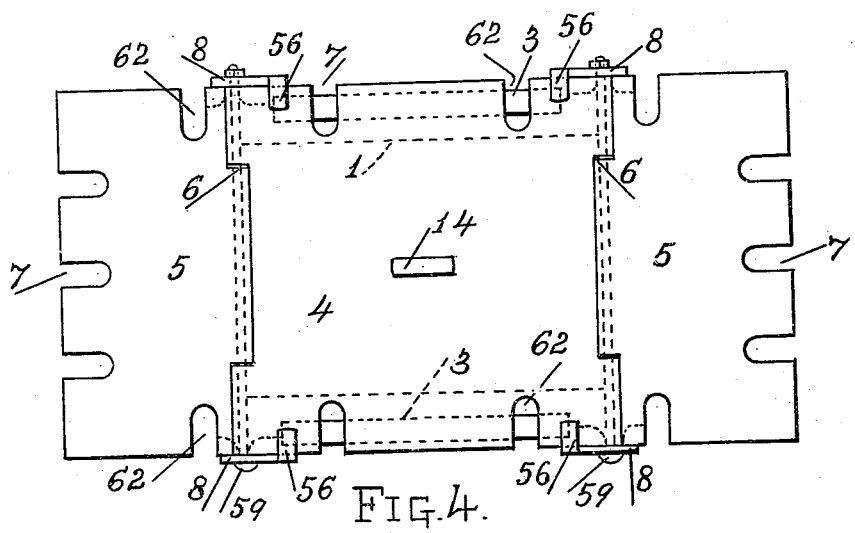
Figure 13:
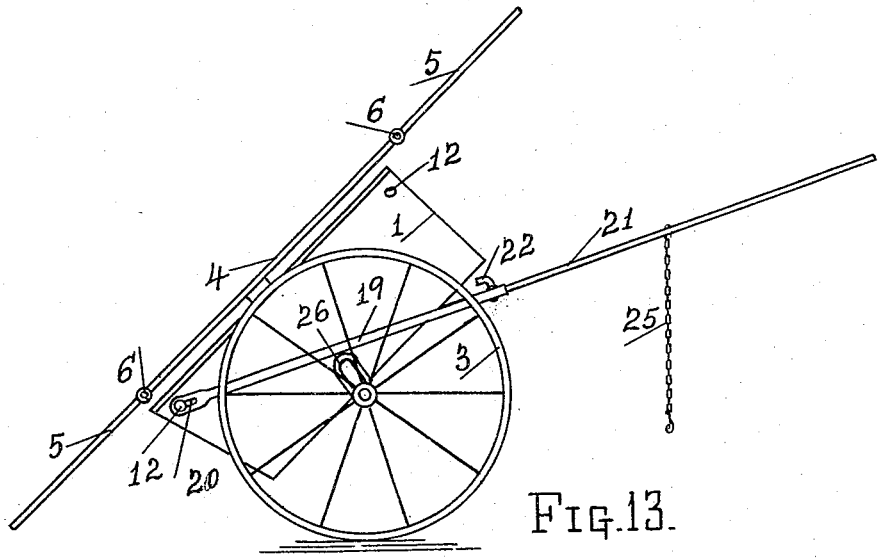
Figure 14:
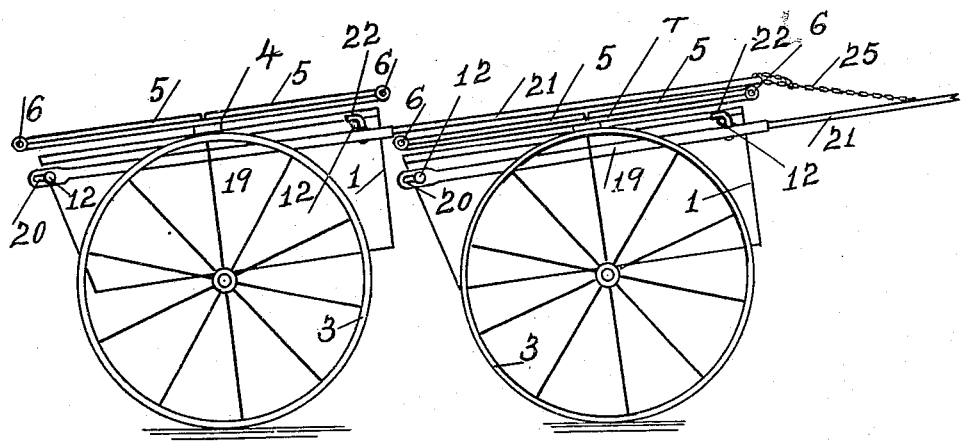

Figure 1 is a side elevation of an armored vehicle embodying my invention. Fig. 2 is a top plan of the mechanism below the shield. The shield is omitted from this view. Fig. 3 is a rear elevation of the machine. Fig. 4 is a reduced partial top plan of the machine, showing the shield with the wing-sections extended. Fig. 5 is a diagrammatic view of the machine in intrenched position. Minor details are omitted from this view. Fig. 6 is a transverse section on the line X. X. of Fig. 1. Fig. 7 is a transverse section on the line Y. Y. of Fig. 1. Fig. 8 is a transverse section on the line S. S. of Fig. 1. Fig 9 is an enlarged vertical section on the line T. T. of Fig. 3. Fig. 10 is an enlarged longitudinal section on the line Z. Z. of Fig. 2. Fig. 11 is an enlarged isometric view of one wing-support. Fig. 12 is a diagram showing the machine tilted so that the lower end of the box is a little above the top of the ground. Fig. 13 is a diagram showing the machine tilted and the wings extended, in position for advancing under fire; and Fig. 14 is a diagram showing two machines hitched together for traveling on the road.

Similar reference numerals designate the same parts in the different views.

The axle 2 is transverse to and secured on the bottom of the box 1. The wheels 3 are adapted to rotate on the spindles 27 unitary with the axle. Rings 28 are connected with the spindles 27 by linch pins 29 and keep the hubs from sliding on the spindles. Longitudinal partitions 30 divide the box into a central compartment 31 to contain food, munitions, &c., and arms compartments 32 to contain the guns of the men manning the machine, the guns being supported in accessible position on the inclined floors 33 as shown in Fig. 1. A door 34 closes the central compartment 31. Two bail-supports 26, one adjacent to each wheel 3, serve to support the bail at a convenient height for pushing forward the vehicle when the hooks 22 are disengaged from the rear rod 12 and the bail is in its depressed position. Each bail-support consists of an arched metal plate 26, rigidly connected with the axle 2 by a bolt 43 extending through the plate 16, the bail-support and the filler block 44. The arched part of the bail-support extends outwardly over the hub of the wheel 3 and prevents the bail from falling down onto the hub. Transverse rods 12 fixed in the box project beyond the sides of the box. The tubular bail-members 19 have longitudinal slots 20. The tubular bail-members give rigidity to the bail without unduly increasing its weight. The slots 20 permit the members 19 to slide on the front rod 12 so that the hooks 22 may be disengaged from the rear rod 12 to permit the bail to be lowered to rest on the bail-supports 26. Bar-iron bail-members 21 bent in the form shown, enter the tubular members 19 and are secured therein by hooks 22 which are adapted to engage on the terminals of the rear rod 12 to support the bail in the position shown in Fig. 1 and upon pulling the bail rearward the hooks may be disengaged from the rod to permit the bail to fall down and rest on the bail-supports 26 as shown in Figs. 5 and 13. A rear handle 10 adapted to be used simultaneously by two men, and two front handles 42 each adapted to be used by one man, are integral with the member 21. The handles 10 and 42 are formed and situated so that the men using them to propel the vehicle when it is tilted and the shield is extended as shown in Fig. 13 will be protected by the shield. A cross bar 23 connects the members 21 and stiffens the bail. Eyes 24 on the cross bar 23 and the handle 10 accommodate chains 25 used to connect together two or more vehicles as shown in Fig. 14.

*Means for connecting the shield with the box.*—A stiff bar 16 extends across the top 53 of the box 1, and downwardly along the sides of the box and is securely connected with the axle as hereinbefore described. The bar 16 supports the central section of the shield. A plate 17 called a filler, is secured on the top of the bar 16 (Fig. 6) and serves to keep the shield at such height above the top of the box that the hinges 6 and the wing supports 8 will clear the top of the box when the shield is rotated. Curved rubbing bars 63 on the box top 53 keep the shield from rocking and rubbing on the top. A bolt 13 has an elongated head 14 and a squared part 45. The elongated bolt head 14 is in line with the central notches at the ends of the wing-sections and when the wing-sections are folded down on the central section the terminals of the bolt head will be in the respective notches and will prevent wabbling of the folded wing-sections. A cylindrical bushing 15 has a square hole accommodating the squared part of the bolt 13 and the bushing is adapted to rotate in alined holes in the plate 17, the bar 16, and the top 53. A washer 50 and a nut 51 on the bolt 13 keep the parts in such relation to each other that the shield may rotate freely above and parallel to the top of the box. A pin 52 prevents accidental turning of the nut.

*Wing supports.*—There are four wing-supports, two right-hand and two left-hand, adapted to limit outward turning of the wing-sections of the shield and adapted to support the extended wing-sections, also adapted to prevent wabbling of the folded wing-sections. The wing-supports are preferably of wrought iron or steel and are preferably forged or pressed from bars or plates of suitable dimensions. Each wing-support comprises a body 8 having a hole 9 adapted to accommodate the hinge bolt 59, and members 54 and 55 at right angles to the body 8 and separated from each other by a space 57, so that the adjacent ends of the members 54 and 55 will not touch the lower member of the hinge. A finger 56 is above and parallel to the member 54 and is separated therefrom by a space 58 slightly greater than the thickness of the central shield-section, so that the wing-supports may be easily placed in position on the central shield-section. When the parts are assembled the member 54 will be under and the finger 56 will be above the central section; the wing-section when extended will rest on the member 55, the body 8 will be supported by the hinge bolt 59 and the finger 56 engaging on the upper surface of the central section will keep the body from turning on the bolt. Each wing-section 5 has two notches 62 adjacent to the wing-supports 8 respectively. The notches 62 are in such position that when the wing-sections are folded down on the central section the fingers 56 will occupy the notches 62 and the wing sections will overlie the notches 7 in the central shield-section and adjacent to the hinges.

*The tiller and connections.*—A metal block 35 is stationary on the under side of the box 1 and has a circular socket 36. A tubular plug 37 is adapted to slide longitudinally in the socket 36 for variable adjustment of the tiller relative to the box. A screw 38 serves to secure the plug in the different positions in which it may be set. At the upper end of the yoke 60 is a stem 40 which is adapted to rotate in the bore of the plug 37. A circular groove 61 around the stem 40 accommodates a fixed tangential pin 41 so that the stem may rotate in the plug and the pin will keep the stem from sliding out of the bore of the plug. The wheel 39 is mounted to rotate in the yoke 60. Upon loosening the screw 38 the plug 37 may be slid upward or downward in the socket 36 to vary the height of the front-end of the box to suit different conditions of use, and when the desired adjustment has been made the screw may be tightened to secure the plug in place.

*Variable adaptations of the machine.*— When the wings are folded and the vehicle is not in action and is being pushed over the field it will occupy the slightly inclined position indicated in Fig. 1; the tiller being so adjusted that the handles will be at convenient height for pushing the machine and the tiller wheel 39 will carry part of the weight of the machine; or the machine may occupy the horizontal position shown in Fig. 12. In either case the machine may be said to be in its folded position. When the machine is disposed for advancing in action, the wings will be extended, and the shield, in the direction of its length, will be at right angles to the axle of the machine. This position of the machine is called its extended position. When the wings are extended and the shield is in such position that the direction of its length is parallel to the axle of the machine as shown in Fig. 5, the machine is said to be in its intrenching position.

*Operation.*—The mode of operating the machine is as follows: To use the machine to advance under fire, the machine will be tilted, the shield will be turned on its axis and the wings will be extended to occupy the position shown in Fig. 13. The shield will then be high enough to fully protect the four men pushing the machine forward; and when an advantageous position has been reached the men will stop the machine and will take their guns from the compartments 32 and resting the guns in the lateral loopholes 7, will take deliberate aim and fire at the enemy. In case of flank attack the machine may be turned to face toward the enemy as occasion may demand.

In order to intrench, the machine will be pushed to the desired position; the shield will be turned on its axis into such position that in the direction of its length, the shield will be parallel to the axle of the machine and the machine will be tilted to the position shown in Fig. 5. The intrenching tools will be taken from the compartment 31, the trench will be dug, the dirt will be thrown over the shield and the shield will protect the men while digging the trench. To withdraw the machine from the trench, the machine will be backed in the trench, the wings will be folded down on the central shield-section as shown in Fig. 12, and the machine will then be pushed out of the trench.

For transportation on the road a number of machines may be hitched together as shown in Fig. 14 and the train of assembled machines may then be pulled by animals or by any suitable tractor.

Having fully described my invention, what I claim as new and desire to secure by Letters Patent is:

1. In an armored vehicle, the combination of an axle, supporting wheels rotative on the axle; a pivot at right angles to the axle and extended beyond the peripheries of the wheels; and a shield adapted to rotate on said pivot in a plane parallel to the axle and clear of the peripheries of the wheels.

2. A machine of the class described comprising a vehicle provided with an axle and supporting wheels rotative on the axle; a pivot at right angles to the axle; a central shield-section rotative on said pivot in a plane parallel to the axle and beyond and clear of the peripheries of the wheels; and wing-sections hinged on opposite edges of the central section.

3. In an armored vehicle, the combination of a box having a compartment for food and munitions and compartments for arms; an axle supporting the box; supporting wheels rotative on the axle; and a shield connected with and adapted to rotate on the box on an axis at right angles to the axle of the machine.

4. In an armored vehicle, the combination of a box, an axle, supporting wheels and a pivot at right angles to the top plane of the box and extended beyond the peripheries of the wheels; with a shield rotative on said pivot beyond and clear of the peripheries of the wheels and parallel to the axle of the machine.

5. In an armored vehicle, the combination of a box and supporting wheels; a bail connected with the box and having a rear handle adapted for simultaneous use by two men and two forward handles each adapted for use by one man; and a shield mounted on the box and adapted to protect all the men using the handles.

6. In an armored vehicle, the combination of a box and supporting wheels; a bail connected with the box and having three handles adapted for simultaneous use by four men to propel the vehicle; bail supports adapted to support the bail in suitable position for pushing the vehicle; and a shield mounted on the box and adapted to protect the four men using the three handles of the bail.

7. In an armored vehicle, the combination of a box and supporting wheels; a front rod transverse to the box; a rear rod transverse to the box; tubular bail-members having slots adapted to accommodate said front rod so that said tubular bail-members may slide on said front rod; bar-iron members adapted to enter said tubular members and having handles; and hooks adapted to connect said bar-iron members with said tubular members and adapted to engage said rear rod to support the bail thereon, at convenient height for pushing the vehicle on the road.

8. In a vehicle of the class described, the combination of supporting wheels; an axle adapted to oscillate in the wheels; a box supported on the axle; a block stationary on the box and having a socket; a plug adapted to slide in the socket of said block; means for securing the plug in variable positions in the socket of the block; a yoke having a stem adapted to rotate in the plug; means to prevent sliding of the stem of the yoke in the plug; and a wheel adapted to rotate in the yoke.

9. In an armored vehicle, the combination of a central shield-section; wing sections complemental to the central section; hinge bolts connecting the wing sections with the central section; and wing-supports supported on the hinge bolts, each wing support having members adapted to engage both sides of the central section and also having a member adapted to support the extended wing section.

10. In an armored cart, the combination of a central shield-section; notched wing sections complemental to the central section; a hinge bolt connecting the wing sections with the central section; wing-supports in fixed relation to the central section, each wing-support having a finger adapted to rest on the upper face of the central section in position to occupy the notch in the wing-section, when the wing-section is folded down on the central section, the notches in said wing-sections and the fingers on said wing-supports being adapted to co-act to prevent wabbling of the folded wing sections.

11. In an armored vehicle, the combination of a box having a top, a stiff bar transverse to the top of the box; a filler on said bar; a shield above said filler; a circular bushing adapted to rotate in the filler, the bar and the top of the box; a bolt having a polygonal part extending through the shield and adapted to engage in and rotate said bushing upon rotation of the shield; and means adapted to prevent longitudinal movement of the bolt.

12. In an armored vehicle, the combination of a central shield-section; a bolt central and immovable relative to said central shield-section and having an elongated head; and wing sections hinged on the central shield-section, each wing-section having at its free end a notch in line with the elongated head of the bolt, and adapted to co-act with one terminal of the bolt head to prevent wabbling of the wing-members when they are folded down on the central section.

13. In an armored vehicle, the combination of a supporting structure; a central shield-section adapted to rotate on the supporting structure in a plane parallel to the axle and beyond the peripheries of the wheels; wing sections adapted to fold down upon the central shield-section and means adapted to prevent wabbling of the folded wing-sections.

In witness whereof I have hereunto signed my name at Auburn, Illinois, this 12th day of January 1916.

STUART J. CLARK.

Witnesses:
CARL BRENNER,
O. A. WINEMAN.

Copies of this patent may be obtained for five cents each, by addressing the "Commissioner of Patents, Washington, D. C."